(12) United States Patent
Fu et al.

(10) Patent No.: US 11,832,292 B2
(45) Date of Patent: Nov. 28, 2023

(54) METHOD AND APPARATUS FOR POWER CONTROL IN V2X COMMUNICATION IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Yi Wang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 17/310,811

(22) PCT Filed: Mar. 27, 2020

(86) PCT No.: PCT/KR2020/004233
§ 371 (c)(1),
(2) Date: Aug. 25, 2021

(87) PCT Pub. No.: WO2020/197331
PCT Pub. Date: Oct. 1, 2020

(65) Prior Publication Data
US 2022/0078812 A1    Mar. 10, 2022

(30) Foreign Application Priority Data

Mar. 28, 2019 (CN) .......................... 201910245229.4
Oct. 25, 2019 (CN) .......................... 201911025890.0

(51) Int. Cl.
*H04W 72/566*    (2023.01)
*H04W 72/1268*    (2023.01)

(52) U.S. Cl.
CPC ..... *H04W 72/569* (2023.01); *H04W 72/1268* (2013.01)

(58) Field of Classification Search
CPC .......... H04W 72/569; H04W 72/1268; H04W 52/38; H04W 72/52; H04W 52/281;
(Continued)

(56) References Cited

U.S. PATENT DOCUMENTS

2018/0019843 A1*  1/2018  Papasakellariou .... H04L 5/0048
2018/0146456 A1   5/2018  Zhou et al.
2020/0314883 A1* 10/2020  Chin ..................... H04W 72/23

OTHER PUBLICATIONS

Nokia et al., "On intra-UE DL/UL prioritization for NR URLLC", 3GPP TSG RAN WG1 Meeting #96, R1-1901917, Athens, Greece, Feb. 25-Mar. 1, 2019, 11 pages.
(Continued)

*Primary Examiner* — Dinh Nguyen

(57) ABSTRACT

A power control method and apparatus are provided in the present application. The power control method includes: receiving resource occupation indication information, where the resource occupation indication information is used to indicate resource occupation situation of second priority data on a PUSCH for transmitting first priority data; determining the resource occupation situation of the PUSCH for transmitting the first priority data according to the resource occupation indication information; and determining power of the PUSCH for transmitting the first priority data according to the resource occupation situation of the PUSCH for transmitting the first priority data.

18 Claims, 5 Drawing Sheets

(58) Field of Classification Search
CPC ............ H04W 52/343; H04W 52/365; H04W 72/566; H04W 52/146; H04W 4/40
See application file for complete search history.

(56) References Cited

OTHER PUBLICATIONS

Vivo, "Power control enhancements for UL intra-UE multiplexing", 3GPP TSG RAN WG1 #96, R1-1901700, Athens, Greece, Feb. 25-Mar. 1, 2019, 3 pages.
Asustek, "Discussion on power control mechanism for UL inter UE Tx multiplexing", 3GPP TSG RAN WG1 #96, R1-1902750, Athens, Greece, Feb. 25-Mar. 1, 2019, 2 pages.
International Search Report and Written Opinion of the International Searching Authority in connection with International Application No. PCT/KR2020/004233 dated Jul. 2, 2020, 9 pages.
Samsung, "Discussion on intra-UE multiplexing/prioritization", 3GPP TSG RAN WG1 #96, R1-1902302, Athens, Greece, Feb. 25-Mar. 1, 2019, 5 pages.

* cited by examiner

[Fig. 1]
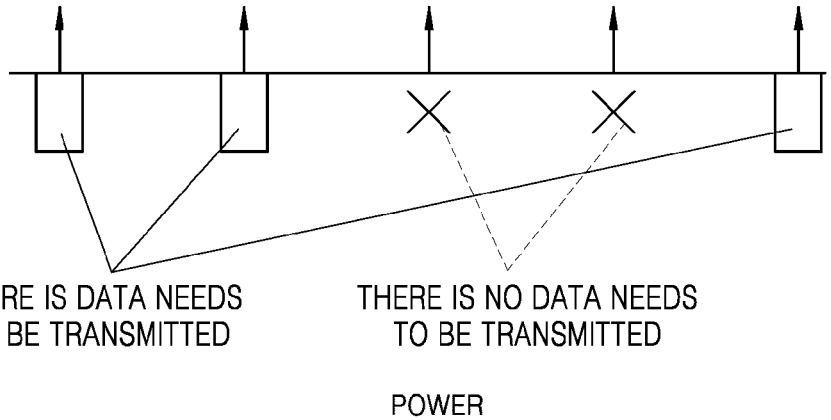
[Fig. 2]
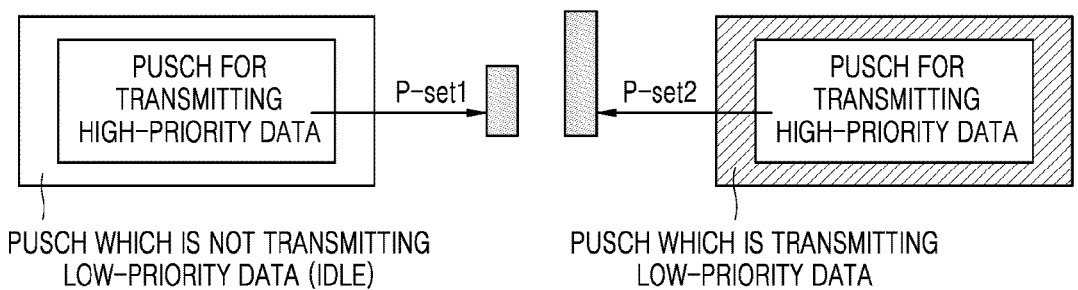
[Fig. 3]
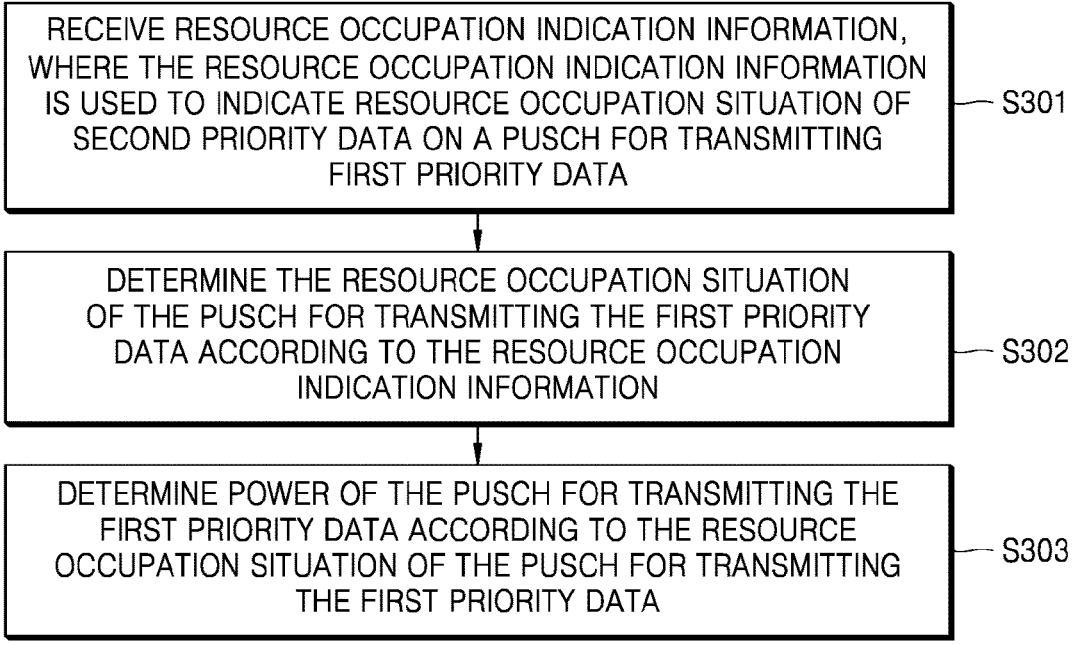

[Fig. 4]
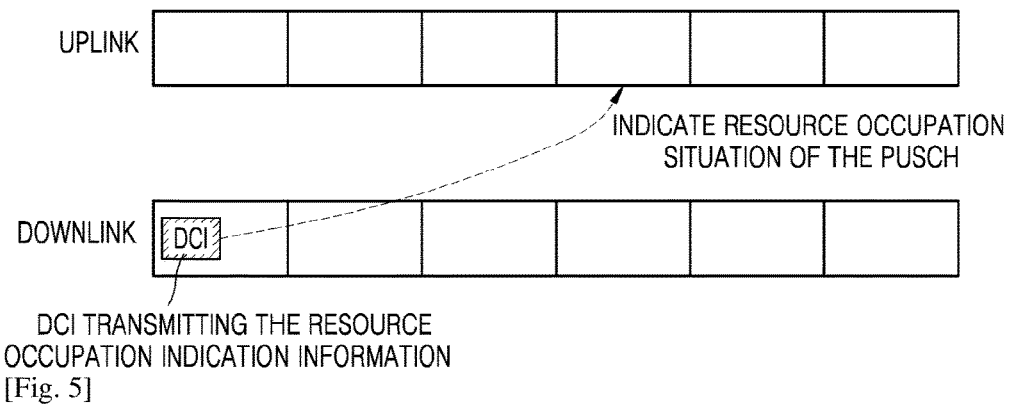
[Fig. 5]
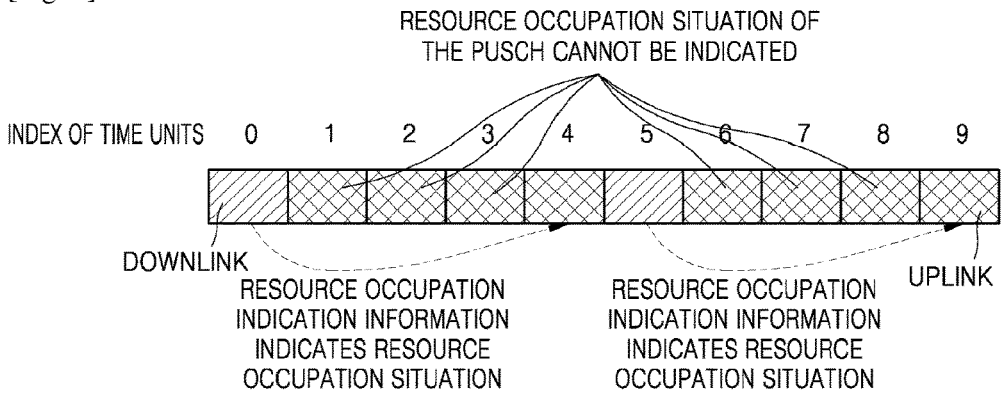
[Fig. 6]
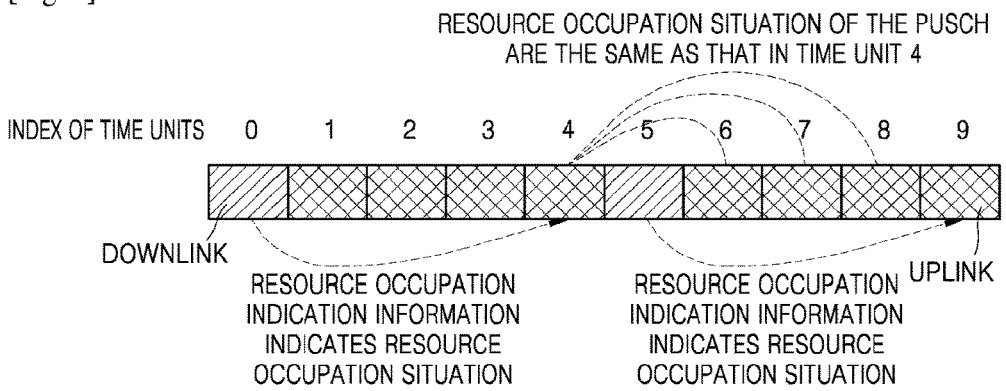
[Fig. 7]
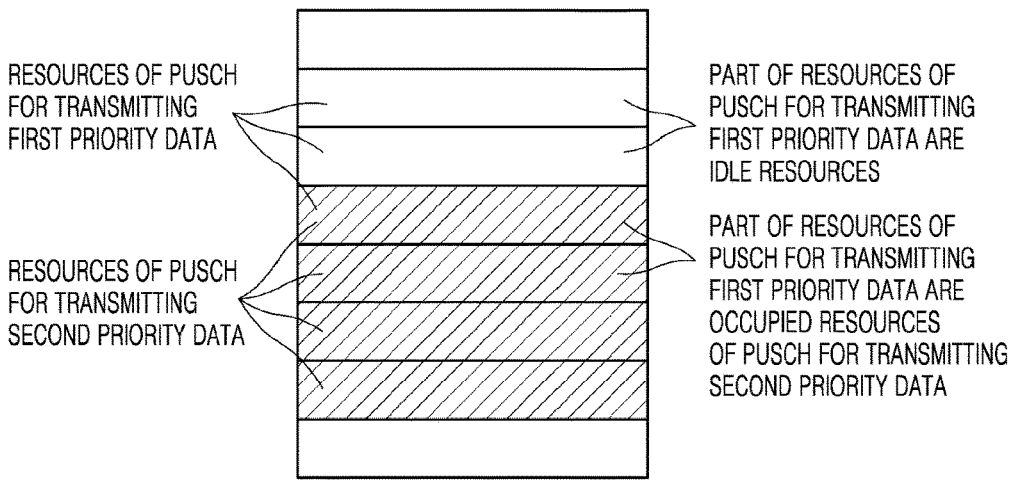

[Fig. 8]
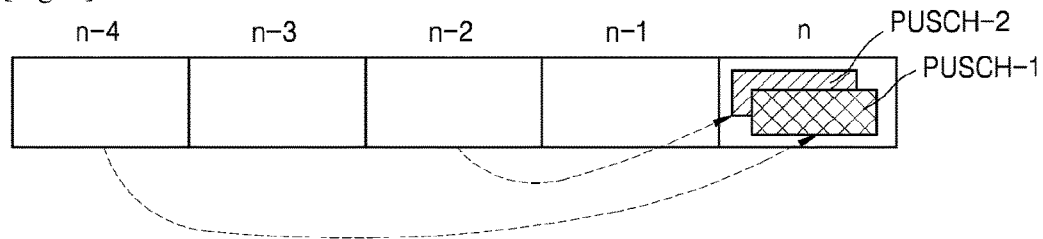
[Fig. 9]
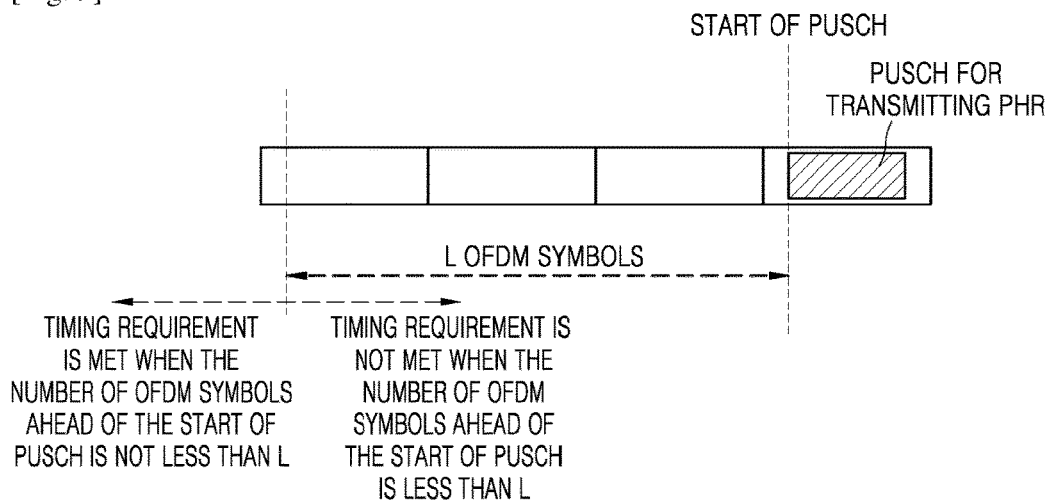
[Fig. 10]
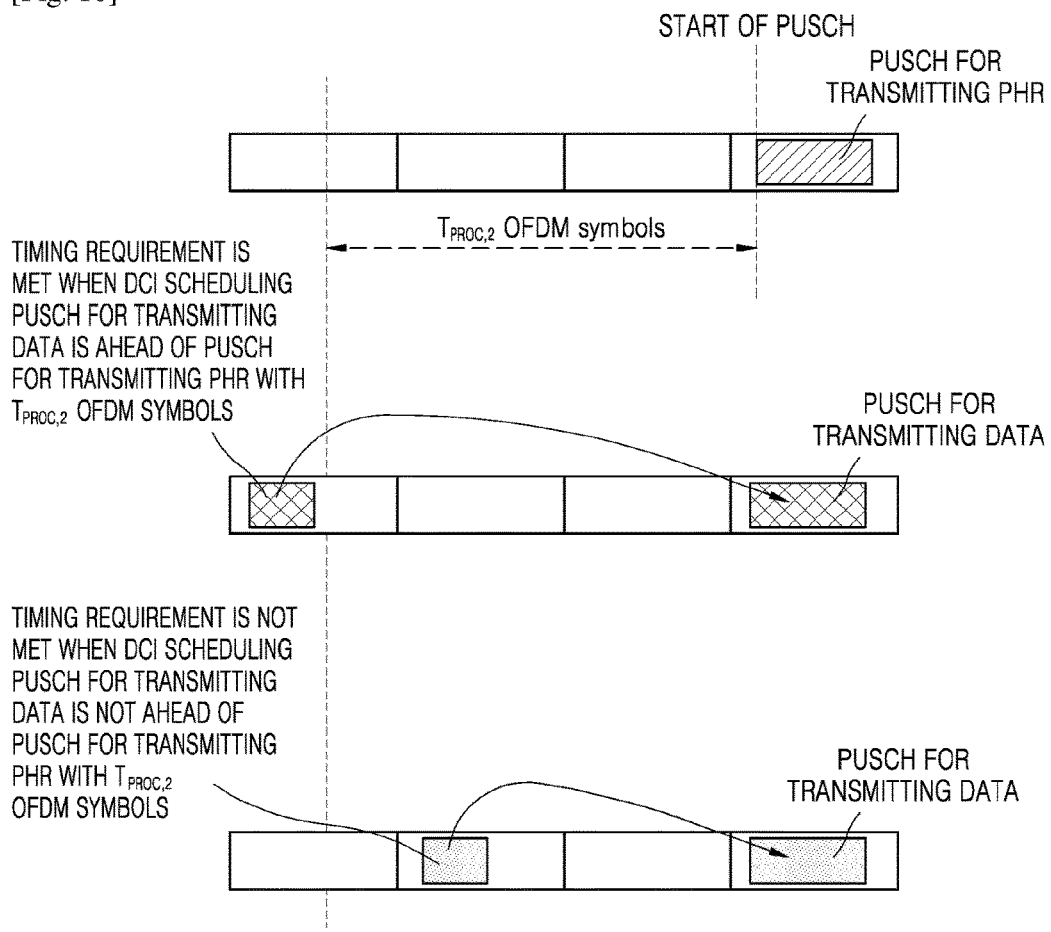

[Fig. 11]
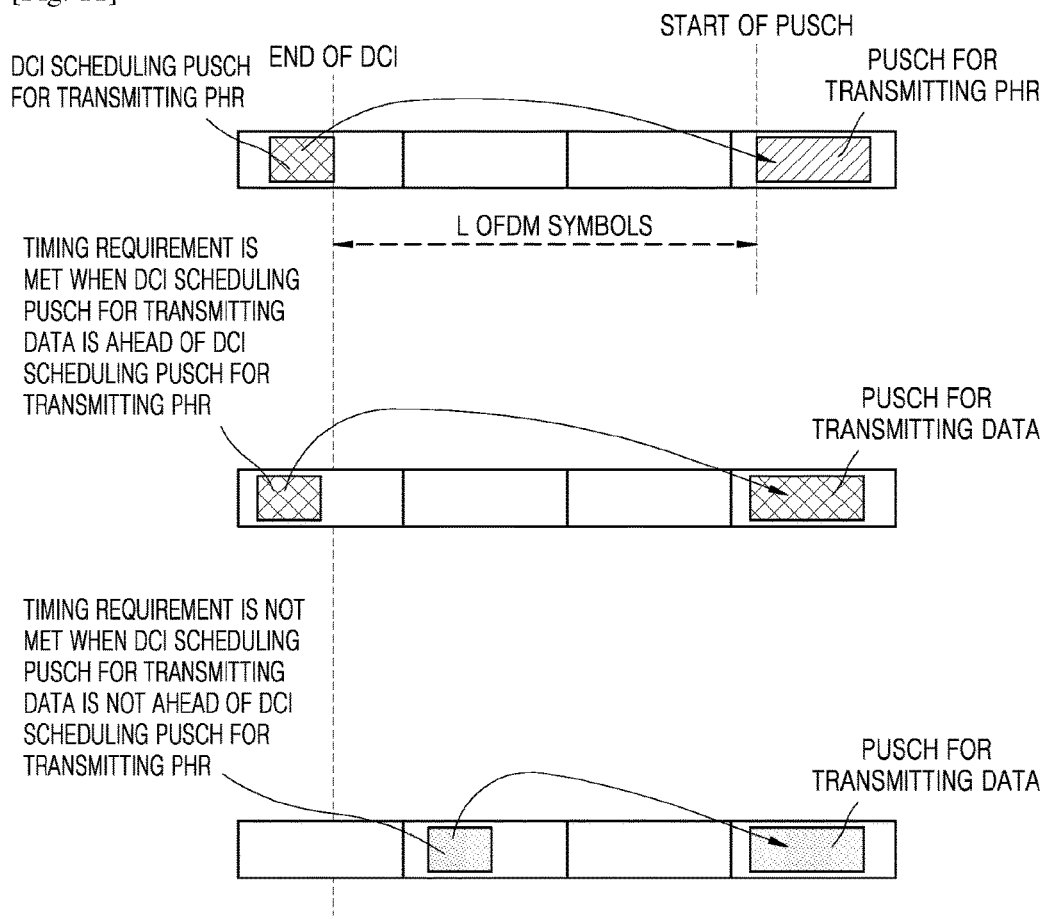
[Fig. 12]
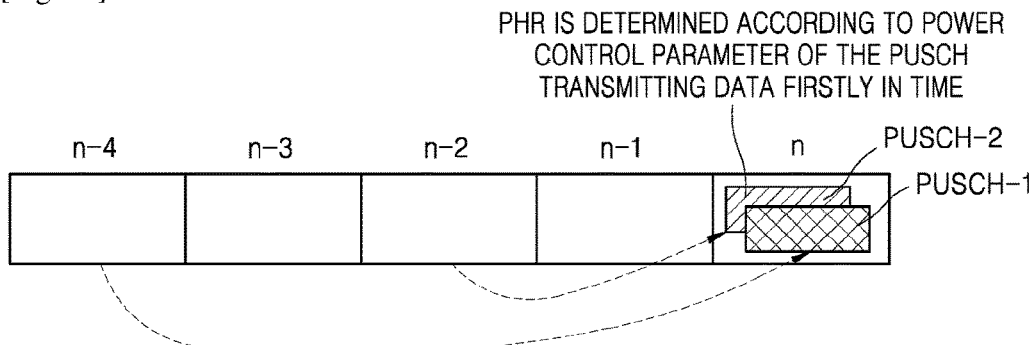
[Fig. 13]
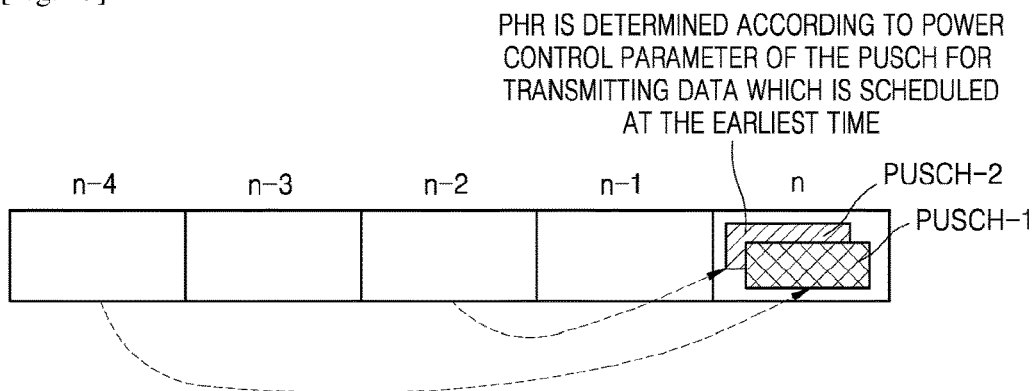

[Fig. 14]
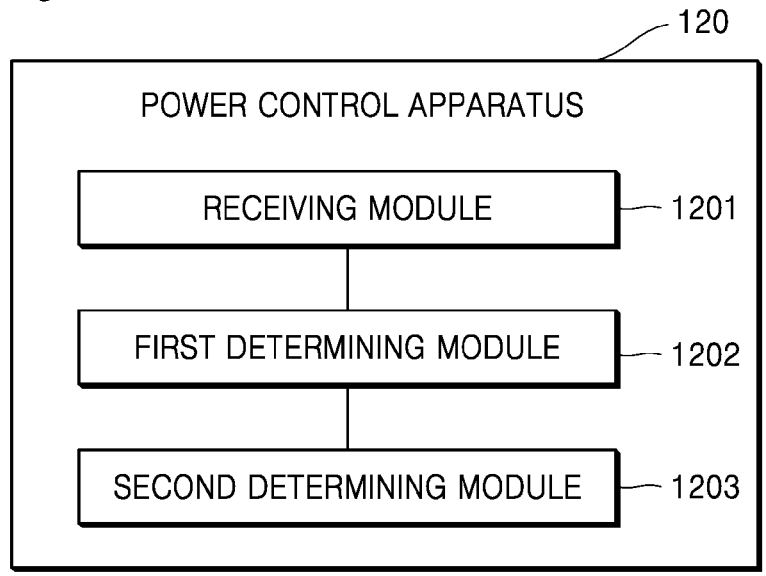
[Fig. 15]
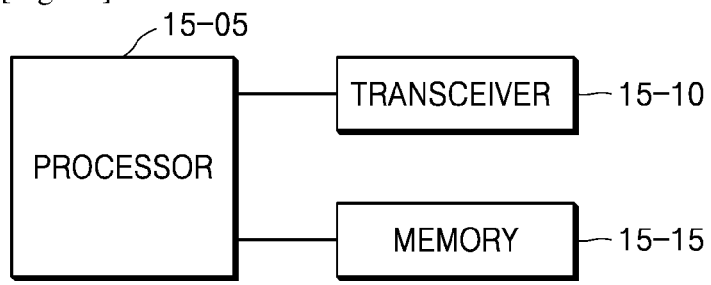
[Fig. 16]
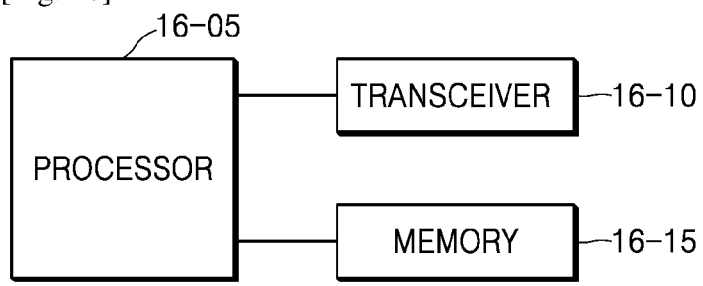

METHOD AND APPARATUS FOR POWER CONTROL IN V2X COMMUNICATION IN WIRELESS COMMUNICATION SYSTEM

CROSS-REFERENCE TO RELATED APPLICATIONS

This application is a 371 of International Application No. PCT/KR2020/004233, filed Mar. 27, 2020, which claims priority to Chinese Patent Application No. 201910245229.4, filed on Mar. 28, 2019, and Chinese Patent Application No. 201911025890.0, filed on Oct. 25, 2019, the disclosures of which are herein incorporated by reference in their entirety.

BACKGROUND

1. Field

The present application relates to the field of wireless communication technologies, and in particular, to a power control method, apparatus, electronic device, and storage medium.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required. For example, methods for easily providing services related to power control in vehicle-to-everything (V2X) communication are required.

SUMMARY

A power control method is provided. The method comprises: receiving resource occupation indication information, where the resource occupation indication information is used to indicate resource occupation situation of second priority data on a physical uplink shared channel (PUSCH) for transmitting first priority data; determining the resource occupation situation of the PUSCH for transmitting the first priority data according to the resource occupation indication information; and determining power of the PUSCH for transmitting the first priority data according to the resource occupation situation of the PUSCH for transmitting the first priority data, wherein, priority of the first priority data is higher than that of the second priority data.

BRIEF DESCRIPTION OF THE DRAWINGS

In order to explain technical solutions in embodiments of the present application more clearly, the drawings that are used in description of the embodiments of the present application will be briefly explained below.

FIG. 1 is a schematic diagram of a transmission time of a grant-free PUSCH according to an embodiment of the present application;

FIG. 2 is a schematic diagram of calculating transmit power of a PUSCH according to an embodiment of the present application;

FIG. 3 is a schematic flowchart of a power control method according to an embodiment of the present application;

FIG. 4 is a schematic diagram of a timing relationship according to an embodiment of the present application;

FIG. 5 is a schematic diagram that resource occupation situation cannot be indicated according to an embodiment of the present application;

FIG. 6 is a schematic diagram of a multiplexing resource occupation situation according to an embodiment of the present application;

FIG. 7 is a schematic diagram of resource occupation situation according to an embodiment of the present application;

FIG. 8 is a schematic diagram of PUSCHs overlapping according to an embodiment of the present application;

FIG. 9 is a schematic diagram of meeting a timing requirement according to an embodiment of the present application;

FIG. 10 is a schematic diagram of a determination method 2 that meets a timing requirement according to an embodiment of the present application;

FIG. 11 is a schematic diagram of a determination method 3 that meets a timing requirement according to an embodiment of the present application;

FIG. 12 is a schematic diagram of a PUSCH used to determine PHR in Method 1 according to an embodiment of the present application;

FIG. 13 is a schematic diagram of a PUSCH used to determine PHR in Method 2 according to an embodiment of the present application; and FIG. 14 is a schematic structural diagram of a power control apparatus according to an embodiment of the present application.

FIG. 15 is a schematic structural diagram of a UE according to an embodiment of the present disclosure.

FIG. 16 is a schematic structural diagram of a network entity according to an embodiment of the present disclosure.

DETAILED DESCRIPTION

In order to overcome or at least partially solve the above technical problems, the following technical solutions are provided:

In a first aspect, the present application provides a power control method, including:
- receiving resource occupation indication information, where the resource occupation indication information is used to indicate resource occupation situation of second priority data on a PUSCH for transmitting first priority data;
- determining the resource occupation situation of the PUSCH for transmitting the first priority data according to the resource occupation indication information; and
- determining power of the PUSCH for transmitting the first priority data according to the resource occupation situation of the PUSCH for transmitting the first priority data,
- wherein, priority of the first priority data is higher than that of the second priority data.

In a possible implementation, the method further includes:
- when the PUSCH for transmitting the first priority data overlaps with the PUSCH for transmitting the second priority data, and the PUSCH for transmitting the first priority data replaces the PUSCH for transmitting the second priority data, determining a PUSCH used to determine PHR from the PUSCH for transmitting the first priority data and the PUSCH for transmitting the second priority data; and
- determining the PHR according to power control parameter of the determined PUSCH used to determine PHR, and transmitting the determined PHR.

In another possible implementation, the determining the PUSCH used to determine PHR from the PUSCH for transmitting the first priority data and the PUSCH for transmitting the second priority data, includes at least one of the following:
- determining the PUSCH used to determine PHR according to the time when each PUSCH transmits data;
- determining the PUSCH used to determine PHR according to the time when each PUSCH is scheduled;
- when each PUSCH includes a PUSCH scheduled by DCI and a configured PUSCH, determining the PUSCH for transmitting the first priority data or the PUSCH for transmitting the second priority data as the PUSCH used to determine PHR; and
- determining the PUSCH used to determine PHR according to relationship between a timer-driven PHR and each PUSCH.

In another possible implementation, the determining the PUSCH used to determine PHR according to the time when each PUSCH transmits data, includes at least one of the following:
- determining the PUSCH transmitting data firstly in time among the PUSCH for transmitting the first priority data and the PUSCH for transmitting the second priority data as the PUSCH used to determine PHR;
- if any one PUSCH among the PUSCH for transmitting the first priority data and the PUSCH for transmitting the second priority data meets the timing requirement, determining the PUSCH that meets the timing requirement as the PUSCH used to determine PHR; and
- if both the PUSCH for transmitting the first priority data and the PUSCH for transmitting the second priority data meet the timing requirement, determining the PUSCH transmitting data firstly in time among the PUSCH for transmitting the first priority data and the PUSCH for transmitting the second priority data as the PUSCH used to determine PHR.

In another possible implementation, the determining the PUSCH used to determine PHR according to the time when each PUSCH is scheduled, includes:
- determining a PUSCH that is scheduled firstly in time to transmit data among the PUSCH for transmitting first priority data and the PUSCH for transmitting second priority data as the PUSCH used to determine PHR.

In another possible implementation, the determining the PUSCH used to determine PHR according to the relationship between the timer-driven PHR and each PUSCH, includes:
- when the timer-driven PHR corresponds to the PUSCH for transmitting the first priority data, determining the PUSCH for transmitting the first priority data as the PUSCH used to determine PHR; and
- when the timer-driven PHR corresponds to the PUSCH for transmitting the second priority data, determining the PUSCH for transmitting the second priority data as the PUSCH used to determine PHR.

In a second aspect, the present application provides a power control apparatus, includes:
- a receiving module, configured to receive resource occupation indication information, where the resource occupation indication information is used to indicate resource occupation situation of second priority data on a PUSCH for transmitting first priority data;
- a first determining module, configured to determine resource occupation situation of the PUSCH for transmitting the first priority data according to the resource occupation indication information; and
- a second determining module, configured to determine power of the PUSCH for transmitting the first priority data according to the resource occupation situation of the PUSCH for transmitting the first priority data,
- wherein, priority of the first priority data is higher than that of the second priority data.

In a third aspect, the present application provides an electronic device, including: a processor and a memory, wherein the memory stores at least one instruction, at least one piece of program, code set, or instruction set, and the at least one instruction, at least one piece of program, code set, or instruction set is loaded and executed by the processor to implement the method in the first aspect of the present application.

In a fourth aspect, the present application provides a computer-readable storage medium, used to store computer instructions, programs, code sets or instruction sets, wherein, when the computer instructions, programs, code sets or instruction sets run on a computer, the computer is caused to execute the method in the first aspect of the present application.

In an embodiment of the present disclosure, a computer program product comprising a computer readable storage medium having a computer readable program stored therein is disclosed. The computer readable program, when executed on a user equipment (UE), causes the UE execute the method in the first aspect of the present application.

In the power control method, apparatus, electronic device and storage medium provided in the present application, whether the resource occupation situation of the PUSCH for transmitting high-priority data is idle or has transmitted low-priority data may be determined according to indication of the resource occupation indication information, and then power of the PUSCH for transmitting high-priority data may be determined according to the determined resource occupation situation, so that power control on the PUSCH may be performed, which may ensure reliability of high-priority data transmission without wasting power.

MODE FOR INVENTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity.

Also, the size of each component does not completely reflect the actual size. In the drawings, like reference numerals denote like elements.

As used herein, the term "and/or" includes any and all combinations of one or more of the associated listed items. Expressions such as "at least one of" when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof. Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, a multimedia system capable of performing communication functions, or the like. In the disclosure, a DL is a wireless transmission path of a signal transmitted from a base station to a terminal, and a UL is a wireless transmission path of a signal transmitted from a terminal to a base station. Throughout the specification, a layer (or a layer apparatus) may also be referred to as an entity. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in a UL. The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, instead of the LTE or LTE-A system.

Hereinafter, embodiments of the present application are detailed described. Examples of the embodiments are shown in the accompanying drawings, wherein the same or similar reference numerals represent the same or similar elements or elements having the same or similar functions throughout. The embodiments described below with reference to the drawings are exemplary and are only used to explain the present application, and cannot be construed as limiting the present application.

Those skilled in the art will understand that, unless specifically stated otherwise, the singular forms "a", "an" and "the" may include plural forms. It should be further understood that the word "comprise" and "include" used in the specification of the present application refers to the presence of the described features, integers, steps, operations, elements and/or components, but does not exclude the presence or addition of one or more other features, integers, steps, operations, elements, components, and/or combinations thereof. It should be understood that when an element is referred to as being "connected" or "coupled" to another element, it can be directly connected or coupled to the other element, or intermediate elements may also be present. Furthermore, "connected" or "coupled" as used herein may include wirelessly connected or wirelessly coupled. As used herein, the term "and/or" includes all or any of the elements and all combinations of one or more of the associated listed items.

To make the objectives, technical solutions, and advantages of the present application clearer, embodiments of the present application will be further detailed described below with reference to the accompanying drawings.

In order to make full use of resources for transmission of two or more kinds of data with different priorities, for example, when enhanced mobile broadband (eMBB) data has occupied all transmission resources and ultra-reliability low latency communication (URLLC) data needs to be transmitted, power for transmitting the URLLC data may be improved so that the URLLC data may be transmitted on the resources occupied by the eMBB data. That is, two or more power control parameter sets are configured for PUSCH for transmitting the URLLC data, which are respectively used when the URLLC data is transmitted on idle resources or on the resources occupied by the eMBB.

FIG. 1 is a schematic diagram of a transmission time of a grant-free PUSCH according to an embodiment of the present application.

In order to meet requirement of low latency transmission of high-priority data, a grant-free (GF) physical uplink shared channel (PUSCH) (grant-free PUSCH is also called configured PUSCH, that is, PUSCH which is not scheduled by DCI for transmission) is used. However, high-priority data does not need to be transmitted at every moment on the grant-free PUSCH. In actual practice, for grant-free PUSCH, sometime there is data to be transmitted and sometime there is no data to be transmitted, as shown in FIG. 1. When there is no data to be transmitted, a user equipment (UE) does not transmit a PUSCH, and the grant-free PUSCH resource becomes idle. In order to make full use of resources, it would be better to transmit low-priority data when no high-priority data needs to be transmitted, so that resources may be fully utilized to transmit data.

FIG. 2 is a schematic diagram of calculating transmit power of a PUSCH according to an embodiment of the present application.

When PUSCH for transmitting high-priority data is transmitted on idle resources, the PUSCH receives relatively small interference and performance is easily guaranteed. At this time, power control parameter set P-set1 may be used for power control of the PUSCH transmission. However, when the PUSCH for transmitting high-priority data is transmitted on a PUSCH that has transmitted low-priority data, the PUSCH receives additional interference, which is relatively large, and performance may not be easily guaranteed. In order to obtain the same performance as when there is no interference of the PUSCH for transmitting low-priority data, the additional interference may be offset by increasing transmission power of the PUSCH for transmitting high-priority data. At this time, power control parameter set P-set2 may be used for power control of the PUSCH transmission. Transmission power of the PUSCH calculated by using the power control parameter set P-set2 is greater than transmission power of the PUSCH calculated by using the power control parameter set P-set1, as shown in FIG. 2.

When high-priority data is transmitted through a grant-free PUSCH, the PUSCH is not scheduled through Downlink Control Information (DCI). Then, a solution is urgently needed, that is, when the UE intends to transmit high-priority data through a grant-free PUSCH, how does the UE know whether the PUSCH is idle or has already transmitted low-priority data.

FIG. 3 is a schematic flowchart of a power control method according to an embodiment of the present application An embodiment of the present application provides a power control method. As shown in FIG. 3, the method includes:

Step S301: Receiving resource occupation indication information, where the resource occupation indication information is used to indicate resource occupation situation of the second priority data on a PUSCH for transmitting the first priority data;

Step S302: Determining the resource occupation situation of the PUSCH for transmitting the first priority data according to the resource occupation indication information; and Step S303: Determining power of the PUSCH for transmitting the first priority data according to the resource occupation situation of the PUSCH for transmitting the first priority data;

wherein, priority of the first priority data is higher than priority of the second priority data.

Execution subject of the method may be a UE or a functional module of the UE. The following embodiments are described by taking the UE as an example.

In step S301 in the embodiment of the present application, the UE receives the resource occupation indication information. In step S302, according to the resource occupation indication information, the resource occupation situation of the PUSCH for transmitting the first priority data is determined, and whether the resource of the PUSCH for transmitting the first priority data is an idle resource or a PUSCH resource that has transmitted the second priority data is determined.

In a feasible implementation, the resource occupation indication information may indicate which resources are PUSCH resources that have transmitted the second priority data. That is, the UE determines which resources have transmitted the second priority data by using the received resource occupation indication information.

In another feasible implementation, the resource occupation indication information may indicate which resources are idle resources. That is, the UE may determine which resources have not transmitted the second priority data by using the received resource occupation indication information.

Subsequently, in step S303, according to whether the PUSCH resource for transmitting the first priority data being an idle resource or the PUSCH resource that has transmitted the second priority data, the UE may determine power of the PUSCH for transmitting the first priority data, for example, determine the power control parameter set to be used, and determine corresponding power according to the determined power control parameter set, so as to perform power control on the PUSCH for transmitting the first priority data according to the determined power.

In the power control method provided in the embodiment of the present application, whether the resource occupation situation of the PUSCH for transmitting high-priority data is idle or has transmitted low-priority data may be determined according to indication of the resource occupation indication information, and then according to the determined resource occupation situation, power of the PUSCH for transmitting high-priority data may be determined, so that power control on the PUSCH may be performed, which may ensure reliability of high-priority data transmission without wasting power.

The inventor of the present application further realizes that after receiving the resource occupation indication information, the UE still needs to solve the problem of how to determine the resource occupation situation of which time unit that the resource occupation indication information indicates. The following provides a feasible solution.

In an embodiment of the present application, a timing relationship is used to enable the UE receiving the resource occupation indication information to know the resource occupation situation of which time unit that the resource occupation indication information corresponds to. As an example, time unit occupied by transmission of the resource occupation indication information (the time unit may be a time slot, or one or more OFDM symbols) is n-k, that is, the resource occupation indication information is transmitted in the n-kth time unit, and the resource occupation indication information describes resource occupation situation of the PUSCH of the time unit n. To determine timing relationship is to determine value of k (also can be referred to as time interval).

Specifically, step S302 may include the following steps:

Step Sa: determining a timing relationship between a first time unit and a second time unit, where the first time unit is a time unit occupied by transmission of resource occupation indication information, and the second time unit is a time unit occupied by PUSCH resource corresponding to the resource occupation situation indicated by the resource occupation indication information; and Step Sb: determining the resource occupation situation of the PUSCH for transmitting the first priority data according to the timing relationship and the resource occupation indication information.

Each time unit may be a time slot, or a plurality of time slots, or an OFDM (Orthogonal Frequency Division Multiplexing) symbol, or a plurality of OFDM symbols.

In an embodiment of the present application, the resource occupation indication information may be transmitted through DCI or may be transmitted through a sequence. The following description is made by taking that the resource occupation indication information is transmitted through DCI as an example. In actual practice, one DCI may provide transmission resource occupation indication information for a plurality of UEs, and the resource occupation indication information is transmitted through UE group-common DCI.

In step Sa, the first time unit is a time unit occupied by transmission of resource occupation indication information, and may also be considered as a time unit of DCI for transmitting UE group-common resource occupation indication information.

The second time unit is a time unit occupied by PUSCH resource corresponding to the resource occupation situation indicated by the resource occupation indication information, i.e., the time unit occupied by a PUSCH that the resource occupation indication information needs to indicate the resource occupation situation is idle or has transmitted the second priority data.

Among them, the first time unit and the second time unit only indicate a distinction between time units of two resources, and cannot be understood as a limitation to the order or value of the time units.

FIG. 4 is a schematic diagram of a timing relationship according to an embodiment of the present application.

According to the determined timing relationship between the first time unit and the second time unit, after receiving DCI for transmitting the UE group-common resource occupation indication information, the UE may know of which time unit the resource occupation situation of the PUSCH for transmitting the first priority data that is described by the resource occupation indication information, so that the resource occupation situation of the PUSCH for transmitting the first priority data may be determined according to the resource occupation indication information, so as to subsequently determine and adjust transmission power of the PUSCH, as shown in FIG. 4.

How the UE obtains the timing relationship between the first time unit and the second time unit in this case is described as follows.

In an embodiment of the present application, methods for determining the timing relationship between the first time unit and the second time unit includes a Method 1: directly obtaining the timing relationship according to a received signaling; or directly acquiring a preset timing relationship.

Specifically, in Method 1, the UE may obtain the foregoing timing relationship according to a received explicit signaling and/or implicit signaling, or acquire the foregoing timing relationship preset by protocol.

The explicit signaling includes, but is not limited to, system information, high-level signaling, media access layer signaling, or physical layer signaling, or the like.

In an example of Method 1, UE obtains the timing relationship between the first time unit and the second time unit by receiving an explicit signaling (signaling that changes slowly, for example, system information, high-level signaling, and media access layer signaling, etc.) transmitted by a base station. That is, the UE obtains value of k by receiving the explicit signaling transmitted by the base station, where k is an integer greater than or equal to zero. When the value of k is configured by a high-level signaling, it may be configured by a common high-level signaling, or may be configured by a UE-specific high-level signaling. For different UEs in a group, values of k may be the same, which may make transmission more convenient in the case of time division duplexing (TDD).

In another example of Method 1, UE determines value of k in manner of preset by protocol. For different UEs, the values of k are the same.

In still another example of Method 1, UE obtains the timing relationship between the first time unit and the second time unit by receiving an implicit signaling transmitted by a base station, that is, the UE obtains value of k by receiving the implicit signaling transmitted by the base station, where k is an integer greater than or equal to zero. In a feasible implementation, it is assumed that the UE has configured a timing relationship set k2 between DCI for scheduling PUSCH and the PUSCH scheduled by the DCI, and value of k of the timing relationship between the first time unit and the second time unit is a value in the timing relationship set k2 (for example, minimum value or maximum value, etc.). For example, the timing relationship set k2 of the UE is {1,2,3,4}, and the minimum value in the timing relationship set k2 is 1, then the value of k of the timing relationship between the first time unit and the second time unit of the UE is 1.

FIG. 5 is a schematic diagram that resource occupation situation cannot be indicated according to an embodiment of the present application.

The Method 1 is relatively easy to implement and requires less signaling overhead. When this Method 1 is employed, in some cases, there may be a case in which the PUSCH for transmitting the first priority data includes a PUSCH of which resource occupation situation cannot be determined according to the resource occupation indication information, that is, some uplink time units cannot make the resource occupation situation indication. For example, in case of asymmetric spectrum, when the number of uplink time units is not equal to the number of downlink time units, for example, there are 2 downlink time units and 8 uplink time units among 10 time units, and k is equal to 4, the resource occupation situation of some uplink time units cannot be indicated, as shown in FIG. 5.

FIG. 6 is a schematic diagram of a multiplexing resource occupation situation according to an embodiment of the present application.

In an embodiment of the present application, a method that may be employed for this is to determine resource occupation situation of a specific PUSCH as resource occupation situation of the PUSCH of which resource occupation situation cannot be determined according to the resource occupation indication information. In simple terms, it may be considered that resource occupation situation of PUSCH of an uplink time unit without being indicated by resource occupation indication information is the same as resource occupation situation of PUSCH of a specific uplink time unit. In a feasible implementation, it may be considered that the resource occupation situation of the PUSCH of the uplink time unit without being indicated by the resource occupation indication information is the same as the resource occupation situation of the PUSCH of the uplink time unit that has recently indicated the resource occupation situation. Following the example above, in the case of asymmetric spectrum, when the number of uplink time units is not equal to the number of downlink time units, for example, there are 2 downlink time units and 8 uplink time units among 10 time units, and k is equal to 4, resource occupation indication information of downlink time unit 0 indicates resource occupation situation of PUSCH of uplink time unit 4, and resource occupation indication information of downlink time unit 5 indicates resource occupation situation of PUSCH of uplink time unit 9. At this time, resource occupation situation of PUSCH of uplink time units 1, 2, and 3 may be determined to be the same as resource occupation situation of PUSCH of uplink time unit that has recently indicated before the uplink time unit 1, and resource occupation situation of PUSCH of uplink time units 6, 7, and 8 is determined to be the same as resource occupation situation of PUSCH of the uplink time unit 4 that has recently indicated before the uplink time unit 6, as shown in FIG. 6.

In an embodiment of the present application, in order to more flexibly determine the foregoing timing relationship, the foregoing timing relationship is obtained in a dynamic manner through Method 2.

Specifically, in Method 2, UE obtains a timing relationship set and timing relationship indication information according to a received signaling; and obtains a timing relationship according to the timing relationship set and the timing relationship indication information.

The received signaling is explicit signaling and/or implicit signaling. The explicit signaling includes, but is not limited to, system information, high-level signaling, media access layer signaling, or physical layer signaling, or the like.

In an embodiment of the present application, the received signaling includes a first sub-signaling and a second sub-signaling. For example, the first sub-signaling is a type of explicit signaling (such as system information or high-level signaling), and the second sub-signaling is another type of explicit signaling (such as physical layer signaling), or the first sub-signaling is an implicit signaling, and the second sub-signaling is an explicit signaling. Appropriate extensions that may be made by those skilled in the art based on these examples should also belong to the spirit and scope of this application.

Specifically, the timing relationship set is obtained according to the received first sub-signaling; and the timing relationship is obtained according to the received second sub-indication corresponding to the resource occupation indication information.

As an example, value of k is obtained through a combination of an explicit signaling (or implicit signaling) and a physical layer signaling, where k is an integer greater than or equal to zero. Taking explicit signaling as an example, UE obtains a timing relationship set (also referred to as a timing relationship set of resource occupation indication information, and the same parts are not described hereinafter) by using an explicit signaling (for example, system information and high-level signaling). For example, the timing relationship set is {k0, k1, k2, k3}. Then, a specific time interval value (i.e., value of k) in the set is indicated by a physical layer signaling. As an example, the timing relationship indication information is a timing relationship indication value, and the corresponding relationship with the timing relationship ki described above is shown in Table 1.

TABLE 1

| Timing Relationship Indication Value | Timing Relationship $k_i$ |
| --- | --- |
| 00 | $k_0$ |
| 01 | $k_1$ |

TABLE 1-continued

| Timing Relationship Indication Value | Timing Relationship $k_i$ |
| --- | --- |
| 10 | $k_2$ |
| 11 | $k_3$ |

Several method for determining the timing relationship set and indicating a specific time interval value (timing relationship) in the set through a physical layer signaling in Method 2 are described as follows.

In a feasible implementation, UE obtains a timing relationship set through an explicit signaling (for example, system information, high-level signaling configuration, where the high-level signaling configuration may be a UE-specific high-level signaling configuration or a UE common high-level signaling configuration), where the timing relationship sets corresponding to resource occupation indication information transmitted in a same DCI for transmitting UE group-common resource occupation indication information are the same. For example, the timing relationship set is {k0, k1, k2, k3}. In addition to transmitting the resource occupation indication information in the DCI for transmitting the UE group-common resource occupation indication information, a timing relationship indication information (for example, a timing relationship indication value) may be transmitted to indicate a value in the timing relationship set as the timing relationship ki between the first time unit and the second time unit. For example, the information in the DCI for transmitting the UE group-common resource occupation indication information is {resource occupation indication information, timing relationship indication value}, where information field of the timing relationship indication value includes L bits (for example, L is 2), and the corresponding relationship of the timing relationship ki between the first time unit and the second time unit is shown in Table 1.

In another feasible implementation, UE obtains a timing relationship set through an implicit signaling (for example, the timing relationship set may be a timing relationship set k2 between DCI scheduling PUSCH in the UE common high-level signaling configuration and the PUSCH scheduled by the DCI), where the timing relationship sets corresponding to resource occupation indication information transmitted in a same DCI for transmitting UE group-common resource occupation indication information are the same. For example, the k2 timing relationship set is {k20, k21, k22, k23}. In addition to transmitting the resource occupation indication information in the DCI for transmitting the UE group-common resource occupation indication information, a specific timing relationship indication information (for example, a timing relationship indication value) may be transmitted to indicate a value in the timing relationship set K2 as the timing relationship ki between the first time unit and the second time unit. For example, the information in the DCI for transmitting the UE group-common resource occupation indication information is {resource occupation indication information, timing relationship indication value}, where information field of the timing relationship indication value includes L bits (for example, L is 2), and the corresponding relationship of the timing relationship ki between the first time unit and the second time unit is shown in Table 2.

TABLE 2

| Timing Relationship Indication Value | Timing Relationship $k2_i$ |
|---|---|
| 00 | $k2_0$ |
| 01 | $k2_1$ |
| 10 | $k2_2$ |
| 11 | $k2_3$ |

Alternatively, the timing relationship set obtained through an implicit signaling is a set of some elements in the timing relationship set k2. For example, the timing relationship set k2 includes 4 elements, and k2 is {k20, k21, k22, k23}, then the timing relationship set obtained through the implicit signaling is a set of the first two elements in the k2 set, which is {k20, k21}.

In an embodiments of the present application, a determination method of the timing relationship may also be obtained according to a default configuration or a received high-level signaling; and the timing relationship is determined based on the obtained determination method. The determination method of the timing relationship includes the above-mentioned Method 1 and Method 2.

That is, the determination method of the timing relationship between the first time unit and the second time unit may employ the above-mentioned Method 1 or Method 2 through a high-level signaling configuration. If the UE does not receive which method in the above-mentioned Method 1 or Method 2 to be employed through a high-level signaling configuration, the UE may use a default method in the above-mentioned Method 1 and Method 2 to determine the timing relationship between the first time unit and the second time unit, for example, Method 1 being the default method.

In an embodiment of the present application, step S303 may specifically include the following implementations:
  if all resources of the PUSCH for transmitting the first priority data are idle resources, a first power is determined as the power of the PUSCH for transmitting the first priority data;
  if all resources of the PUSCH for transmitting the first priority data are occupied resources of the PUSCH for transmitting the second priority data, a second power is determined as the power of the PUSCH for transmitting the first priority data; and
  if part of the resources of the PUSCH for transmitting the first priority data are occupied resources of the PUSCH for transmitting the second priority data, and another part of the resources are idle resources, the power of the PUSCH for transmitting the first priority data is determined according to a predetermined method.
  The first power is lower than the second power.

As an example, the first power is transmission power of the PUSCH calculated by using power control parameter set P-set1, and the second power is transmission power of the PUSCH calculated by using power control parameter set P-set2.

FIG. 7 is a schematic diagram of resource occupation situation according to an embodiment of the present application.

For a case in which part of the resources of the PUSCH for transmitting the first priority data are occupied resources of the PUSCH for transmitting the second priority data, and another part of the resources are idle resources, as shown in FIG. 7, an embodiment of the present application provides the following power control methods.

Method 1: the second power is determined as the power of all resources of the PUSCH for transmitting the first priority data.

If the resources of the PUSCH for transmitting the first priority data are idle resources, the power of the PUSCH may be relatively low, denoted as P1. If the resources of the PUSCH for transmitting the first priority data are occupied resources of the PUSCH for transmitting the second priority data, the power of the PUSCH may be relatively high, denoted as P2.

If part of the resources of the PUSCH for transmitting the first priority data are occupied resources of the PUSCH for transmitting the second priority data, and another part of the resources are idle resources, at this time, the resources of the PUSCH for transmitting the first priority data may use a relatively high power P2. That is, when determining the powers, it is assumed that the resources of the PUSCH for transmitting the first priority data are all occupied resources of the PUSCH for transmitting the second priority data, so that the resource powers of the PUSCH are equal, which may ensure the reliability of the first priority data transmission.

Method 2: a third power is determined as the power of all resources of the PUSCH for transmitting the first priority data, and the third power is obtained according to at least one of the first power, the second power, the PUSCH resources corresponding to the first power, and the PUSCH resources corresponding to the second power.

If the resources of the PUSCH for transmitting the first priority data are idle resources, the power of the PUSCH may be relatively low, denoted as P1. If the resources of the PUSCH for transmitting the first priority data are occupied resources of the PUSCH for transmitting the second priority data, the power of the PUSCH may be relatively high, denoted as P2.

If part of the resources of the PUSCH for transmitting the first priority data are occupied resources of the PUSCH for transmitting the second priority data, and another part of the resources are idle resources, at this time, the power of the PUSCH is calculated respectively according to the resources of the PUSCH for transmitting the first priority data being occupied resources of the PUSCH for transmitting the second priority data or idle resources. That is, when the resources of the PUSCH for transmitting the first priority data are occupied resources of the PUSCH for transmitting the second priority data, the power of this part resources is P2, and when the resources of the PUSCH for transmitting the first priority data are idle resources, the power of this part resources is P1, and then P1 and P2 is averaged with respect to the occupied resources of the PUSCH for transmitting the second priority data and the idle resources to obtain the power of all resources of the PUSCH for transmitting the first priority data. For example, the PUSCH for transmitting the first priority data includes 20 physical resource blocks (PRBs), where resources of 10 PRBs are occupied resources of the PUSCH for the second priority data, with calculation power of each PRB being P2, and resources of 10 PRBs are idle resources, with calculation power of each PRB being P1, then average method is: $(10*P1+10*P2)/20=(P1+P2)/2$. All PRBs use the power of $(P1+P2)/2$.

Method 3: power of all resources of the PUSCH for transmitting the first priority data is determined according to ratio of occupied resources for transmission of second priority PUSCH to idle resources among the resources of the PUSCH for transmitting the first priority data.

If the resources of the PUSCH for transmitting the first priority data are idle resources, the power of the PUSCH may be relatively low, denoted as P1. If the resources of the PUSCH for transmitting the first priority data are occupied resources of the PUSCH for transmitting the second priority data, the power of the PUSCH may be relatively high, denoted as P2.

If part of the resources of the PUSCH for transmitting the first priority data are occupied resources of the PUSCH for transmitting the second priority data, and another part of the resources are idle resources, at this time, the power of all resources of the PUSCH for transmitting the first priority data may be determined according to ratio of occupied resources for transmission of second priority PUSCH to idle resources among the resources of the PUSCH for transmitting the first priority data. For example, if the ratio of the occupied resources for transmission of the second priority PUSCH to the idle resources among the resources of the PUSCH for transmitting the first priority data is larger than a threshold (denoted as th1), the second power is determined as the power of all resources of the PUSCH for transmitting the first priority data. That is, all resources of the PUSCH for transmitting the first priority data use the relatively high power P2. Otherwise, the first power is determined as the power of all resources of the PUSCH for transmitting the first priority data. That is, if the ratio of the occupied resources for transmission of the second priority PUSCH to the idle resources among the resources of the PUSCH for transmitting the first priority data is less than or equal to the threshold (denoted as th1), all resources of the PUSCH for transmitting the first priority data use the relatively low power P1.

FIG. 8 is a schematic diagram of PUSCHs overlapping according to an embodiment of the present application.

The inventor of the present application has found that, in order to meet low latency characteristics of the first priority data transmission, when the PUSCH for transmitting the first priority data overlaps with the PUSCH for transmitting the second priority data, the PUSCH for transmitting the first priority data may replace the PUSCH for transmitting the second priority data. As shown in FIG. 8, the DCI in time slot n-4 schedules PUSCH-1 for transmission in time slot n, and the DCI in time slot n-2 schedules PUSCH-2 for transmission in time slot n, PUSCH-2 overlaps with PUSCH-1, and PUSCH-2 has higher priority than PUSCH-1, thus PUSCH-2 is used for transmitting in time slot n, and PUSCH-1 is not used for transmitting in time slot n. Then, in this case, when the PUSCH for transmitting the first priority data overlaps with the PUSCH for transmitting the second priority data, and the PUSCH for transmitting the first priority data replaces the PUSCH for transmitting the second priority data, a power headroom report (PHR) may be determined according to a first power control parameter of the PUSCH for transmitting the first priority data which meets the latency requirements, and the determined PHR is transmitted.

In general, the PHR may be determined according to one of the first power control parameter of the PUSCH for transmitting the first priority data, a second power control parameter of the PUSCH for transmitting the second priority data, and a default power control parameter, and the determined PHR may be transmitted.

Specifically, when the PUSCH for transmitting the first priority data meets the timing requirement (at this time, regardless of the PUSCH for transmitting the second priority data meets the timing requirement), the PHR is determined according to the first power control parameter;

when the PUSCH for transmitting the first priority data does not meet the timing requirement and the PUSCH for transmitting the second priority data meets the timing requirement, the PHR is determined according to the second power control parameter; and when neither the PUSCH for transmitting the first priority data nor the PUSCH for transmitting the second priority data meets the timing requirement, the PHR is determined according to the default power control parameter.

FIG. 9 is a schematic diagram of meeting a timing requirement according to an embodiment of the present application.

It should be noted that meeting the timing requirement means that it takes a certain time to calculate the PHR according to the PUSCH power control parameters before transmitting the PHR on the PUSCH, that is, a preparation time is required. For example, the PUSCH for transmitting PHR is started at the m-th OFDM symbol in the time slot n, and processing timing is L OFDM symbols, then the UE needs to know the PUSCH power control parameters for calculating the PHR before the L OFDM symbols before the m-th OFDM symbol in the time slot n of the PUSCH for transmitting PHR, so as to calculate the PHR. If the UE can know the PUSCH power control parameter for calculating the PHR before the L OFDM symbols before the m-th OFDM symbol in the time slot n of the PUSCH for transmitting the PHR, the PHR can be calculated according to the PUSCH power control parameter. Then, the PUSCH corresponding to the PUSCH power control parameter for calculating the PHR meets the timing requirement. If the UE cannot know the PUSCH power control parameter for calculating the PHR before the L OFDM symbols before the m-th OFDM symbol in the time slot n of the PUSCH for transmitting the PHR, the PHR cannot be calculated according to the PUSCH power control parameter. Then the PUSCH corresponding to the PUSCH power control parameter for calculating the PHR does not meet the timing requirement, as shown in FIG. 9.

In an embodiment of the present application, the method for determining whether the PUSCH for transmitting data meets the timing requirement includes at least one of the following determination methods.

Determination method 1: when the PUSCH for transmitting data is configured, the PUSCH for transmitting data meets the timing requirement.

Determination method 2: when the PUSCH for transmitting PHR is configured and the PUSCH for transmitting data is scheduled by DCI, if the number of OFDM symbols spaced between the last one OFDM symbol of physical downlink control channel (PDCCH) of the DCI scheduling the PUSCH for transmitting data and the start OFDM symbol of the PUSCH for transmitting PHR is not less than a predetermined value L, the PUSCH for transmitting data meets the timing requirement; otherwise, the PUSCH for transmitting data does not meet the timing requirement.

The predetermined value L may be equal to Tproc,2, and the value of L may be preset by protocol.

FIG. 10 is a schematic diagram of a determination method 2 that meets a timing requirement according to an embodiment of the present application.

As an example, if the last one OFDM symbol of the PDCCH of the DCI scheduling the PUSCH for transmitting data is Tproc,2 OFDM symbols earlier than the start OFDM symbol of the PUSCH for transmitting PHR, it is said that the PUSCH for transmitting data meets the timing requirement. If the number of OFDM symbols where the last one OFDM symbol of the PDCCH of the DCI scheduling the PUSCH for transmitting data is ahead of the start OFDM symbol of the PUSCH for transmitting PHR is less than Tproc,2 OFDM symbols, it is said that the PUSCH for calculating the PHR does not meet the timing requirement, as shown in FIG. 10.

Determination method 3: when both the PUSCH for transmitting PHR and the PUSCH for transmitting data are scheduled by the DCI, if end position of the last one OFDM symbol of the PDCCH of the DCI scheduling the PUSCH for transmitting data is ahead of end position of the last one OFDM symbol of the PDCCH of the DCI scheduling the PUSCH for transmitting PHR, the PUSCH for transmitting data meets the timing requirement; otherwise, the PUSCH for transmitting data does not meet the timing requirement.

FIG. 11 is a schematic diagram of a determination method 3 that meets a timing requirement according to an embodiment of the present application.

Specifically, when both the PUSCH for transmitting PHR and the PUSCH for transmitting data are scheduled by the DCI, if end position of the last one OFDM symbol of the PDCCH of the DCI scheduling the PUSCH for transmitting data is ahead of the last one OFDM symbol of the PDCCH of the DCI scheduling the PUSCH for transmitting PHR, the PUSCH for transmitting data meets the timing requirement; if end position of the last one OFDM symbol of the PDCCH of the DCI scheduling the PUSCH for transmitting data is not ahead of the last one OFDM symbol of the PDCCH of the DCI scheduling the PUSCH for transmitting PHR, the PUSCH for transmitting data does not meet the timing requirement, as shown in FIG. 11.

It can be understood that the above-mentioned PUSCH for transmitting data includes a PUSCH for transmitting the first priority data and/or a PUSCH for transmitting the second priority data.

Cases where the PUSCH for transmitting data meets the timing requirement or not in various situations, and the corresponding PHR calculation method, are described as follows.

Case 1.1: The PUSCH for transmitting PHR is configured (i.e., configured PUSCH), and both the PUSCH for transmitting the first priority data and the PUSCH for transmitting the second priority data are scheduled by DCI.

In this case, whether the PUSCH for transmitting the first priority data and the PUSCH for transmitting the second priority data meet the timing requirement may be determined by using the above-mentioned determination method 2.

Optionally, whether the PUSCH for transmitting the first priority data meets the timing condition may be first determined. If the PUSCH for transmitting the first priority data meets the timing requirement, the PHR is determined directly according to the first power control parameter. If the PUSCH for transmitting the first priority data does not meet the timing requirement, then whether the PUSCH for transmitting the second priority data meets the timing condition may be determined. If the PUSCH for transmitting the second priority data meets the timing requirement, the PHR is determined according to the second power control parameter. If the PUSCH for transmitting the second priority data does not meet the timing requirement either, the PHR is determined according to the default power control parameter.

Optionally, whether the PUSCH for transmitting the first priority data and the PUSCH for transmitting the second priority data meet the timing requirement may be determined at the same time. Then, if both the PUSCH for transmitting the first priority data and the PUSCH for transmitting the second priority data meet the timing requirement, the PHR is determined according to the first power control parameter; if the PUSCH for transmitting the first priority data does not meet the timing requirement, and the PUSCH for transmitting the second priority data meets the timing requirement, the PHR is determined according to the second power control parameter; if the PUSCH for transmitting the first priority data meets the timing requirement, and the PUSCH for transmitting the second priority data does not meet the timing requirement, the PHR is determined according to the first power control parameter; and if neither the PUSCH for transmitting the first priority data nor the PUSCH for transmitting the second priority data meets the timing requirement, the PHR is determined according to the default power control parameter.

Case 1.2: the PUSCH for transmitting PHR is configured, the PUSCH for transmitting the first priority data is scheduled by DCI, and the PUSCH for transmitting the second priority data is configured.

It may be known from the determination method 1 that since the PUSCH for transmitting the second priority data is configured, it may be considered that the timing requirement is always met. In this case, whether the PUSCH for transmitting the first priority data meets the timing requirement may be determined by using the above-mentioned determination method 2.

If it is determined that the PUSCH for transmitting the first priority data meets the timing requirement, the PHR is determined according to the first power control parameter; and if it is determined that the PUSCH for transmitting the first priority data does not meet the timing requirement, the PHR is determined according to the second power control parameter.

Case 1.3: the PUSCH for transmitting PHR is configured, the PUSCH for transmitting the first priority data is configured, and the PUSCH for transmitting the second priority data is scheduled by DCI.

It may be known from the determination method 1 that since the PUSCH for transmitting the first priority data is configured, it may be considered that the timing requirement is always met. In this case, the PHR may be determined according to the first power control parameter.

Case 1.4: the PUSCH for transmitting PHR is configured, and both the PUSCH for transmitting the first priority data and the PUSCH for transmitting the second priority data are configured.

Similarly, it may be known from the determination method 1 that since the PUSCH for transmitting the first priority data is configured, it may be considered that the timing requirement is always met. In this case, the PHR may be determined according to the first power control parameter.

Case 2.1: both the PUSCH for transmitting PHR, the PUSCH for transmitting the first priority data, and the PUSCH for transmitting the second priority data are scheduled by DCI.

In this case, whether the PUSCH for transmitting the first priority data and the PUSCH for transmitting the second priority data meet the timing requirement may be determined by using the above-mentioned determination method 3.

Optionally, whether the PUSCH for transmitting the first priority data meets the timing condition may be first determined. If the PUSCH for transmitting the first priority data meets the timing requirement, the PHR is determined directly according to the first power control parameter. If the PUSCH for transmitting the first priority data does not meet the timing requirement, whether the PUSCH for transmitting the second priority data meets the timing condition may be determined. If the PUSCH for transmitting the second priority data meets the timing requirement, the PHR is determined according to the second power control parameter. If the PUSCH for transmitting the second priority data does not meet the timing requirement either, the PHR is determined according to the default power control parameter.

Optionally, whether the PUSCH for transmitting the first priority data and the PUSCH for transmitting the second priority data meet the timing requirement may be determined at the same time. Then, if both the PUSCH for transmitting the first priority data and the PUSCH for transmitting the second priority data meet the timing requirement, the PHR is determined according to the first power control parameter; if the PUSCH for transmitting the first priority data does not meet the timing requirement, and the PUSCH for transmitting the second priority data meets the timing requirement, the PHR is determined according to the second power control parameter; if the PUSCH for transmitting the first priority data meets the timing requirement, and the PUSCH for transmitting the second priority data does not meet the timing requirement, the PHR is determined according to the first power control parameter; and if neither the PUSCH for transmitting the first priority data nor the PUSCH for transmitting the second priority data meets the timing requirement, the PHR is determined according to the default power control parameter.

Case 2.2: the PUSCH for transmitting PHR is scheduled by DCI, the PUSCH for transmitting the first priority data is scheduled by DCI, and the PUSCH for transmitting the second priority data is configured.

It may be known from the determination method 1 that since the PUSCH for transmitting the second priority data is configured, it may be considered that the timing requirement is always met. In this case, whether the PUSCH for transmitting the first priority data meets the timing requirement may be determined by using the above-mentioned determination method 3.

If it is determined that the PUSCH for transmitting the first priority data meets the timing requirement, the PHR is determined according to the first power control parameter; and if it is determined that the PUSCH for transmitting the first priority data does not meet the timing requirement, the PHR is determined according to the second power control parameter.

Case 2.3: the PUSCH for transmitting PHR is scheduled by DCI, the PUSCH for transmitting the first priority data is configured, and the PUSCH for transmitting the second priority data is scheduled by DCI.

It may be known from the determination method 1 that since the PUSCH for transmitting the first priority data is configured, it may be considered that the timing requirement is always met. In this case, the PHR may be determined according to the first power control parameter.

Case 2.4: the PUSCH for transmitting PHR is scheduled by DCI, and both the PUSCH for transmitting the first priority data and the PUSCH for transmitting the second priority data are configured.

Similarly, it may be known from the determination method 1 that since the PUSCH for transmitting the first priority data is configured, it may be considered that the timing requirement is always met. In this case, the PHR may be determined according to the first power control parameter.

Through the PHR reporting methods in the above cases, the PHR reporting may more accurately reflect the power usage of the data actually to be transmitted, and may make fuller use of power.

Further, in order to meet the low latency characteristics of the first priority data transmission, when the PUSCH for transmitting the first priority data overlaps with the PUSCH for transmitting the second priority data, the PUSCH for transmitting the first priority data may replace the PUSCH for transmitting the second priority data. For example, as shown in FIG. 8, the DCI in time slot n-4 schedules PUSCH-1 for transmission in time slot n, and the DCI in time slot n-2 schedules PUSCH-2 for transmission in time slot n, PUSCH-2 overlaps with PUSCH-1, and PUSCH-2 has higher priority than PUSCH-1, thus PUSCH-2 is used for transmitting in time slot n, and PUSCH-1 is not used for transmitting in time slot n. Then, in this case, when the PUSCH for transmitting the first priority data overlaps with the PUSCH for transmitting the second priority data, and the PUSCH for transmitting the first priority data replaces the PUSCH for transmitting the second priority data, the PUSCH for determining PHR is determined from the PUSCH for transmitting the first priority data and the PUSCH for transmitting the second priority data; and the PHR is determined according to the determined power control parameter of the PUSCH for determining the PHR, and the determined PHR is transmitted.

It may be known from the above that in the process of determining the PHR by using the power control parameter, the focus is to determine whether the power control parameter used in the process of determining the PHR is the PUSCH for transmitting the first priority data or the PUSCH for transmitting the second priority data. Therefore, the determination of PUSCH used to determine PHR from the PUSCH for transmitting the first priority data and the PUSCH for transmitting the second priority data include any one of the following methods 1, 2, 3, and 4:

Method 1: the PUSCH used to determine PHR is determined according to the time when each PUSCH transmits data.

That is, it may be known from the above Method 1 that, in Method 1, the PUSCH used to determine PHR may be determined according to the time when the PUSCH for transmitting the first priority data transmits data and the time when the PUSCH for transmitting the second priority data transmits data.

Specifically, in a possible implementation for Method 1: the determination of the PUSCH used to determine PHR according to the time when each PUSCH transmits data, includes: determining a PUSCH transmitting data firstly in time among the PUSCH for transmitting the first priority data and the PUSCH for transmitting the second priority data as the PUSCH used to determine PHR.

FIG. 12 is a schematic diagram of a PUSCH used to determine PHR in Method 1 according to an embodiment of the present application.

Specifically, the PUSCH transmitting data firstly in time is determined as the PUSCH used to determine PHR, and the PHR (Power Headroom Report) is determined according to power control parameter of the PUSCH transmitting data firstly in time, and the determined PHR is transmitted. For example, as shown in FIG. 12, PUSCH-2 is ahead of PUSCH-1 in time, so PUSCH-2 may be determined as the PUSCH used to determine the PHR, and the PHR is determined according to the power control parameter of PUSCH-2, and the determined PHR is transmitted.

In the above implementation, only the order of the time when the PUSCH for transmitting the first priority data and the PUSCH for transmitting the second priority data transmit data needs to be considered, so as to determine the PUSCH used to determine PHR. In the following embodiments, whether these two PUSCHs meet the timing requirement need to be considered firstly, and then the PUSCH used to determine PHR is determined. The detailed method is as follows.

In another possible implementation of Method 1, the determination of the PUSCH used to determine PHR according to the time when each PUSCH transmits data, includes: if any one PUSCH among the PUSCH for transmitting the first priority data and the PUSCH for transmitting the second priority data meets the timing requirement, determining the PUSCH that meets the timing requirement as the PUSCH used to determine PHR; or if both the PUSCH for transmitting the first priority data and the PUSCH for transmitting the second priority data meet the timing requirement, determining the PUSCH transmitting data firstly in time among the PUSCH for transmitting the first priority data and the PUSCH for transmitting the second priority data as the PUSCH used to determine PHR.

In the embodiment of the present application, whether each of the PUSCH among the PUSCH for transmitting the first priority data and the PUSCH for transmitting the second priority data meets the timing requirement may be determined firstly. If both of them meet the timing requirement, the PUSCH transmitting data firstly in time among the PUSCH for transmitting the first priority data and the PUSCH for transmitting the second priority data is determined as the PUSCH used to determine PHR, and the PHR is determined according to the power control parameter of the PUSCH transmitting data firstly in time, and the determined PHR is transmitted; if only one of the PUSCH for transmitting the first priority data and the PUSCH for transmitting the second priority data meets the timing requirement, the PUSCH that meets the timing requirement is determined as the PUSCH used to determine the PHR, and the PHR is determined according to the power control parameter of the PUSCH that meets the timing requirement, and the determined PHR is transmitted; however, if both of them do not meet the timing requirement, the PHR is determined according to the default power control parameter, and the determined PHR is transmitted.

The method for determining whether each PUSCH among the PUSCH for transmitting the first priority data and the PUSCH for transmitting the second priority data meets the timing requirement is detailed described in the above-mentioned embodiment, and details are not described herein again.

Method 2: PUSCH used to determine PHR is determined according to the time when each PUSCH is scheduled.

In Method 2, the PUSCH used to determine PHR is determined according to the time when each PUSCH among PUSCH for transmitting the first priority data and PUSCH for transmitting the second priority data is scheduled, and the PHR is determined according to power control parameter of the determined PUSCH, and then the determined PHR is transmitted.

Specifically, the determination of the PUSCH used to determine PHR according to the time when each PUSCH is scheduled includes: determining a PUSCH that is scheduled firstly in time to transmit data among the PUSCH for transmitting the first priority data and the PUSCH for transmitting the second priority data as the PUSCH used to determine PHR. That is, the PUSCH that is scheduled at the earliest time to transmit data is determined as the PUSCH used to determine PHR.

FIG. 13 is a schematic diagram of a PUSCH used to determine PHR in Method 2 according to an embodiment of the present application.

Further, the PHR is determined according to power control parameter of the PUSCH that is scheduled at the earliest time to transmit data, and the determined PHR is transmitted. As shown in FIG. 13, the PUSCH that is scheduled at the earliest time is PUSCH-1, then the PHR is determined according to power control parameter of PUSCH-1, and the determined PHR is transmitted.

Further, PUSCH used to determine PHR may further be determined according to type of PUSCH (type of each PUSCH among PUSCH for transmitting first priority data and PUSCH for transmitting second priority data), in addition to the time when PUSCH transmits data and the time when PUSCH is scheduled, and the PHR may be determined according to power control parameter of the determined PUSCH, and then the determined PHR may be transmitted.

In a possible example, the types of the PUSCH include: PUSCH scheduled by DCI and configured PUSCH. Therefore, in this case, the method for determining the PUSCH used to determine PHR is detailed described in Method 3.

Method 3: If a PUSCH scheduled by DCI and a configured PUSCH are included in PUSCHs, a PUSCH for transmitting first priority data or a PUSCH for transmitting second priority data is determined as a PUSCH used to determine PHR.

Specifically, if the PUSCH scheduled by DCI and the configured PUSCH are included in the PUSCH for transmitting the first priority data and the PUSCH for transmitting the second priority data, the PUSCH scheduled by DCI may be selected as the PUSCH used to determine PHR, and the PHR may be determined according to power control parameter of the determined PUSCH, and the determined PHR may be transmitted. Of course, the configured PUSCH may also be selected as the PUSCH used to determine PHR, and the PHR may be determined according to power control parameter of the determined PUSCH, and then the determined PHR may be transmitted.

Further, in the above described Method 3, the PUSCH used to determine PHR is determined according to type of the PUSCH. In another possible implementation, the PUSCH used to determine PHR may also be determined according to relationship between timer-driven PHR and each PUSCH. The detailed method is as follows:

Method 4: PUSCH used to determine PHR is determined according to relationship between timer-driven PHR and each PUSCH.

The relationships between the timer-driven PHR and each PSCH may include: the timer-driven PHR is a PHR for PUSCH for transmitting first priority data, and the timer-driven PHR is a PHR for PUSCH for transmitting second priority data. In the embodiment of the present application, the PHR for the PUSCH for transmitting the first priority data may be referred to as a first priority PHR, and the PHR for the PUSCH for transmitting the second priority data may be referred to as a second priority PHR. That is, the first priority PHR and the second priority PHR are driven by different timers.

Therefore, based on the above embodiments, the determination of the PUSCH used to determine PHR according to the relationship between the timer-driven PHR and each PUSCH, includes: if the timer-driven PHR corresponds to the PUSCH for transmitting the first priority data, the PUSCH for transmitting the first priority data is determined as the PUSCH used to determine PHR; and if the timer-driven PHR corresponds to the PUSCH for transmitting the second priority data, the PUSCH for transmitting the second priority data is determined as the PUSCH used to determine PHR.

Further, after determining the PUSCH used to determine PHR, the PHR is determined according to power control parameter of the determined PUSCH, and then the determined PHR is transmitted.

In a possible example of the above described Method 4, as shown in FIG. 8, the DCI in time slot n-4 schedules PUSCH-1 for transmission in time slot n (it may also be time unit n), and the DCI in time slot n-2 schedules PUSCH-2 for transmission in time slot n (it may also be time unit n), that is, when the PUSCH for transmitting first priority data overlaps with the PUSCH for transmitting the second priority data, and the PUSCH for transmitting the first priority data replaces the PUSCH for transmitting the second priority data, if the PHR timer drives the first priority PHR on the time unit n, the PUSCH for transmitting the first priority data is determined as the PUSCH used to determine PHR, and the PHR is determined according to power control parameter of the PUSCH for transmitting the first priority data, and then the determined PHR is transmitted.

In another possible example of the above described Method 4, when PUSCH for transmitting the first priority data overlaps with PUSCH for transmitting second priority data in time unit n+k, and the PUSCH for transmitting the first priority data replaces the PUSCH for transmitting the second priority data, if the PHR timer drives the second priority PHR on the time unit n+k, the PUSCH for transmitting the second priority data is determined as the PUSCH used to determine PHR, and the PHR is determined according to power control parameter of the PUSCH for transmitting the second priority data, and then the determined PHR is transmitted.

FIG. 14 is a schematic structural diagram of a power control apparatus according to an embodiment of the present application.

An embodiment of the present application further provides a power control apparatus. As shown in FIG. 14, the power control apparatus 120 may include a receiving module 1201, a first determining module 1202, and a second determining module 1203.

The receiving module is configured to receive resource occupation indication information. The resource occupation indication information is used to indicate resource occupation situation of second priority data on a physical uplink shared channel (PUSCH) for transmitting first priority data.

The first determining module is configured to determine the resource occupation situation of the PUSCH for transmitting the first priority data according to the resource occupation indication information.

The second determining module is configured to determine power of the PUSCH for transmitting the first priority data according to the resource occupation situation of the PUSCH for transmitting the first priority data.

Priority of the first priority data is higher than that of the second priority data.

The first determining module 1202 is configured to determine the resource occupation situation of the physical uplink shared channel (PUSCH) for transmitting the first priority data according to the resource occupation indication information.

The second determining module 1203 is configured to determine the power of the PUSCH for transmitting the first priority data according to the resource occupation situation of the PUSCH for transmitting the first priority data.

In an optional implementation, the first determining module 1202 is specifically configured to:
determine a timing relationship between a first time unit and a second time unit, where the first time unit is a time unit occupied by transmission of resource occupation indication information, and the second time unit is a time unit occupied by PUSCH resource corresponding to the resource occupation situation indicated by the resource occupation indication information; and
determine the resource occupation situation of the PUSCH for transmitting the first priority data according to the timing relationship and the resource occupation indication information.

In an optional implementation, the first determining module 1202 is specifically configured to:
obtain the timing relationship according to a received signaling; or,
acquire a preset timing relationship.

In an optional implementation, the first determining module 1202 is specifically configured to:
obtain a timing relationship set and timing relationship indication information according to the received signaling; and
obtain the timing relationship according to the timing relationship set and the timing relationship indication information.

In an optional implementation, the received signaling includes a first sub-signaling and a second sub-signaling, and the first determining module 1202 is specifically configured to:
obtain the timing relationship set according to the received first sub-signaling; and
obtain the timing relationship according to the received second sub-signaling corresponding to the resource occupation indication information.

In an optional implementation, the received signaling is an explicit signaling and/or an implicit signaling.

In an optional implementation, the first determining module 1202 is specifically configured to:
obtain a determination method of the timing relationship according to a default configuration or a received high-level signaling; and
determine the timing relationship according to the obtained determination method.

In an optional implementation, the first determining module 1202 is further configured to:
determine resource occupation situation of a specific PUSCH as resource occupation situation of a PUSCH of which resource occupation situation cannot be determined according to the resource occupation indication information.

In an optional implementation, the second determining module 1203 is specifically configured to:
if all resources of the PUSCH for transmitting the first priority data are idle resources, determine a first power as the power of the PUSCH for transmitting the first priority data;
if all resources of the PUSCH for transmitting the first priority data are occupied resources of the PUSCH for transmitting the second priority data, determine a second power as the power of the PUSCH for transmitting the first priority data; and
if part of the resources of the PUSCH for transmitting the first priority data are occupied resources of the PUSCH for transmitting the second priority data, and another part of the resources are idle resources, determine the power of the PUSCH for transmitting the first priority data according to a predetermined method.

The first power is smaller than the second power.

In an optional implementation, the second determining module 1203 is specifically configured to perform any one of the following:
- determine the second power as the power of all resources of the PUSCH for transmitting the first priority data;
- determine a third power as the power of all resources of the PUSCH for transmitting the first priority data, and the third power is obtained according to at least one of the first power, the second power, and the PUSCH resources corresponding to the first power, and the PUSCH resources corresponding to the second power; and
- determine the power of all resources of the PUSCH for transmitting the first priority data according to a ratio of occupied resources for transmission of second priority PUSCH to idle resources among the resources of the PUSCH for transmitting the first priority data.

In an optional implementation, the power control apparatus 120 further includes a first determining and transmitting module.

The first determining and transmitting module is configured to: when the PUSCH for transmitting the first priority data overlaps with the PUSCH for transmitting the second priority data, and the PUSCH for transmitting the first priority data replaces the PUSCH for transmitting the second priority data, according to one of a first power control parameter of the PUSCH for transmitting the first priority data, a second power control parameter of the PUSCH for transmitting the second priority data, and a default power control parameter, determine a PHR, and transmit the determined PHR.

In an optional implementation, the first determining and transmitting module is specifically configured to:
- when the PUSCH for transmitting the first priority data meets a timing requirement, determine the PHR according to the first power control parameter;
- when the PUSCH for transmitting the first priority data does not meet the timing requirement and the PUSCH for transmitting the second priority data meets the timing requirement, determine the PHR according to the second power control parameter; and
- when neither the PUSCH for transmitting the first priority data nor the PUSCH for transmitting the second priority data meets the timing requirement, determine the PHR according to the default power control parameter.

In an optional implementation, the PUSCH for transmitting data meets the timing requirement that includes at least one of the following situations:
- when the PUSCH for transmitting data is configured, the PUSCH for transmitting data meets the timing requirement;
- when the PUSCH for transmitting PHR is configured and the PUSCH for transmitting data is scheduled by DCI, if the number of orthogonal frequency division multiplexing (OFDM) symbols spaced between the last one OFDM symbol of physical downlink control channel (PDCCH) of the DCI scheduling the PUSCH for transmitting data and the start OFDM symbol of the PUSCH for transmitting PHR is not less than a predetermined value, the PUSCH for transmitting data meets the timing requirement; otherwise, the PUSCH for transmitting data does not meet the timing requirement; and
- when both the PUSCH for transmitting PHR and the PUSCH for transmitting data are scheduled by the DCI, if end position of the last one OFDM symbol of the PDCCH of the DCI scheduling the PUSCH for transmitting data is ahead of end position of the last one OFDM symbol of the PDCCH of the DCI scheduling the PUSCH for transmitting PHR, the PUSCH for transmitting data meets the timing requirement; otherwise, the PUSCH for transmitting data does not meet the timing requirement.

The PUSCH for transmitting data includes the PUSCH for transmitting the first priority data and/or the PUSCH for transmitting the second priority data.

In an optional implementation, when the PUSCH transmitting the first priority data overlaps with the PUSCH transmitting the second priority data, and the PUSCH for transmitting the first priority data replaces the PUSCH for transmitting the second priority data, the power control apparatus 120 may further include a third determining module and a second determining and transmitting module.

The third determining module is configured to determine a PUSCH used to determine a PHR from the PUSCH for transmitting the first priority data and the PUSCH for transmitting the second priority data.

The second determining and transmitting module is configured to determine the PHR according to power control parameter of the determined PUSCH used to determine PHR, and transmit the determined PHR.

In an optional implementation, the third determining module is specifically configured to perform any one of the following:
- determine the PUSCH used to determine PHR according to the time when each PUSCH transmits data;
- determine the PUSCH used to determine PHR according to the time when each PUSCH is scheduled;
- when each PUSCH includes a PUSCH scheduled by DCI and a configured PUSCH, determine the PUSCH for transmitting the first priority data or the PUSCH for transmitting the second priority data as the PUSCH used to determine PHR; and
- determine the PUSCH used to determine PHR according to relationship between a timer-driven PHR and each PUSCH.

In an optional implementation, the third determining module is specifically configured to perform any one of the following when determining the PUSCH used to determine PHR according to the time when each PUSCH transmits data:
- determine the PUSCH transmitting data firstly in time among the PUSCH for transmitting the first priority data and the PUSCH for transmitting the second priority data as the PUSCH used to determine PHR;
- if any one PUSCH among the PUSCH for transmitting the first priority data and the PUSCH for transmitting the second priority data meets the timing requirement, determine the PUSCH that meets the timing requirement as the PUSCH used to determine PHR; and
- if both the PUSCH for transmitting the first priority data and the PUSCH for transmitting the second priority data meet the timing requirement, determine the PUSCH transmitting data firstly in time among the PUSCH for transmitting the first priority data and the PUSCH for transmitting the second priority data as the PUSCH used to determine PHR.

In an optional implementation, when determining the PUSCH used to determine PHR according to the time when each PUSCH is scheduled, the third determining module is specifically configured to: determine a PUSCH that is scheduled firstly in time to transmit data among the PUSCH for transmitting first priority data and the PUSCH for transmitting second priority data as the PUSCH used to determine PHR.

In an optional implementation, when determining the PUSCH used to determine PHR according to the relationship between the timer-driven PHR and each PUSCH, the third determining module is specifically configured to: when the timer-driven PHR corresponds to the PUSCH for transmitting the first priority data, determine the PUSCH for transmitting the first priority data as the PUSCH used to determine PHR; and when the timer-driven PHR corresponds to the PUSCH for transmitting the second priority data, determine the PUSCH for transmitting the second priority data as the PUSCH used to determine PHR.

Further, the first determining module 1202, the second determining module 1203, and the third determining module in the above embodiments may be a same determining module, or may be different determining modules, or may be combined into a same determining module, which are not limited in the embodiments of the present application. The first determining and transmitting module and the second determining and transmitting module in the above embodiments may be a same module or different modules, which are not limited in the embodiments of the present application.

Those skilled in the art may clearly understand that the power control apparatus provided in the embodiments of the present application has the same implementation principle and technical effects as the foregoing method embodiments. For convenience and brevity of description, as for portions of this embodiment that are not mentioned, reference may be made to corresponding content in the foregoing method embodiments, and details are not described again.

An embodiment of the present application further provides an electronic device (for example, terminal device), including a processor and a memory. The memory stores at least one instruction, at least one piece of program, a code set, or an instruction set. The at least one instruction, the at least one piece of program, the code set or the instruction set is loaded and executed by the processor to implement the corresponding content in the foregoing method embodiments.

Optionally, the electronic device may further include a transceiver. The processor is connected to the transceiver, such as via a bus. It should be noted that, in actual practice, the number of the transceiver is not limited to one, and the structure of the electronic device does not constitute a limitation to the embodiments of the present application.

The processor may be a CPU, a general-purpose processor, a DSP, an ASIC, an FPGA, or other programmable logic device, a transistor logic device, a hardware component, or any combination thereof. The processor may implement or execute various exemplary logical blocks, modules, and circuits described in connection with the disclosure of the present application. The processor may also be a combination that implements computing functions, such as a combination of one or more microprocessors, a combination of a DSP and a microprocessor, and so on.

The bus may include a path to transfer information between the aforementioned components. The bus may be a PCI bus or an EISA bus. The bus may be an address bus, a data bus, a control bus, and the like. The memory may be a ROM or other type of static storage device that may store static information and instructions, a RAM or other type of dynamic storage device that may store information and instructions, or may be a EEPROM, a CD-ROM or other optical disk storage, optical disk storage (including compact discs, laser discs, optical discs, digital versatile discs, and Blu-ray discs, etc.), a disk storage media or other magnetic storage device, or any other media that may carry or store desired program code in form of instructions or data structures and can be accessed by the computer, but this embodiment is not limited to this.

FIG. 15 is a block diagram illustrating a UE according to an exemplary embodiment of the present disclosure.

FIG. 15 schematically illustrates a User Equipment (UE) according to an embodiment of the present disclosure.

The UEs or the power control apparatus described above may correspond to the UE of FIG. 15.

Referring to the FIG. 15, the UE may include a processor 1505, a transceiver 1510 and a memory 1515. However, all of the illustrated components are not essential. The UE may be implemented by more or less components than those illustrated in FIG. 15. In addition, the processor 1505 and the transceiver 1510 and the memory 1515 may be implemented as a single chip according to another embodiment.

The aforementioned components will now be described in detail.

The processor 1505 may include one or more processors or other processing devices that control the proposed function, process, and/or method. Operation of the UE may be implemented by the processor 1505.

The processor 1505 may detect a PDCCH on a configured control resource set. The processor 1505 determines a method for dividing CBs and a method for rate matching of a PDSCH according to the PDCCH. The processor 1505 may control the transceiver 1510 to receive the PDSCH according to the PDCCH. The processor 1505 may generate HARQ-ACK information according to the PDSCH. The processor 1505 may control the transceiver 1510 to transmit the HARQ-ACK information.

The transceiver 1510 may include a RF transmitter for up-converting and amplifying a transmitted signal, and a RF receiver for down-converting a frequency of a received signal. However, according to another embodiment, the transceiver 1510 may be implemented by more or less components than those illustrated in components.

The transceiver 1510 may be connected to the processor 1505 and transmit and/or receive a signal. The signal may include control information and data. In addition, the transceiver 1510 may receive the signal through a wireless channel and output the signal to the processor 1505. The transceiver 1510 may transmit a signal output from the processor 1505 through the wireless channel.

The memory 1515 may store the control information or the data included in a signal obtained by the UE. The memory 1515 may be connected to the processor 1505 and store at least one instruction or a protocol or a parameter for the proposed function, process, and/or method. The memory 1515 may include read-only memory (ROM) and/or random access memory (RAM) and/or hard disk and/or CD-ROM and/or DVD and/or other storage devices.

FIG. 16 is a block diagram illustrating a network entity according to an exemplary embodiment of the present disclosure.

The network entities, for example, base stations, eNBs, gNBs, network functions, and any other network entity described above may correspond to the network entity of FIG. 16.

Referring to the FIG. 16, the network entity may include a processor 1605, a transceiver 1610 and a memory 1615. However, all of the illustrated components are not essential.

The network entity may be implemented by more or less components than those illustrated in FIG. 16. In addition, the processor 1605 and the transceiver 1610 and the memory 1615 may be implemented as a single chip according to another embodiment.

The aforementioned components will now be described in detail.

The processor 1605 may include one or more processors or other processing devices that control the proposed function, process, and/or method. Operation of the network entity may be implemented by the processor 1605.

The transceiver 1610 may include a RF transmitter for up-converting and amplifying a transmitted signal, and a RF receiver for down-converting a frequency of a received signal. However, according to another embodiment, the transceiver 1610 may be implemented by more or less components than those illustrated in components.

The transceiver 1610 may be connected to the processor 1605 and transmit and/or receive a signal. The signal may include control information and data. In addition, the transceiver 1610 may receive the signal through a wireless channel and output the signal to the processor 1605. The transceiver 1610 may transmit a signal output from the processor 1605 through the wireless channel.

The memory 1615 may store the control information or the data included in a signal obtained by the network entity. The memory 1615 may be connected to the processor 1605 and store at least one instruction or a protocol or a parameter for the proposed function, process, and/or method. The memory 1615 may include read-only memory (ROM) and/or random access memory (RAM) and/or hard disk and/or CD-ROM and/or DVD and/or other storage devices.

An embodiment of the present application further provides a computer-readable storage medium. The computer storage medium is configured to store computer instructions, and when the computer instructions are run on a computer, the computer may execute the corresponding content in the foregoing method embodiments.

An embodiment of the present disclosure further provides a computer program product comprising a computer readable storage medium having a computer readable program stored therein. The computer readable program, when executed on a user equipment (UE), causes the UE execute the corresponding content in the foregoing method embodiments.

It should be understood that although steps in the flowchart of the drawings are sequentially showed in accordance with the directions of the arrows, these steps are not necessarily performed in the order indicated by the arrows. Unless explicitly stated herein, the execution order of these steps is not strictly limited, and they may be performed in other orders. Moreover, at least part of the steps in the flowchart of the drawing may include a plurality of sub-steps or a plurality of stages. These sub-steps or stages are not necessarily performed at the same time, and may be performed at different times. The execution order is not necessarily performed sequentially, and may be performed in turn or alternately with other steps or at least part of the sub-steps or stages of other steps.

The above description is only part of the implementations of the present application. It should be noted that for those ordinary skilled in the art, several improvements and retouching may be made without departing from the principles of the present application, and these improvements and retouching should be regarded within the scope of protection of this application.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product. Although the present disclosure has been described with various embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke, for example, "means for function claim" unless the exact words "means for" are followed by a participle.

The invention claimed is:

1. A power control method performed by a user equipment (UE), the method comprising:
   receiving, from a base station (BS), resource occupation indication information, wherein the resource occupation indication information includes information about at least one second resource allocated for second priority data;
   determining at least one first resource for transmitting first priority data, based on the resource occupation indication information and a time offset value; and
   determining a power for transmitting the first priority data on the at least one first resource via a physical uplink shared channel (PUSCH),
   wherein a priority of the first priority data is higher than that of the second priority data, and
   wherein the time offset value is a difference time value between a time unit for transmitting the resource occupation indication information and a time unit for a resource scheduled by the resource occupation indication information.

2. The power control method of claim 1, further comprising:
   receiving, from the BS, a signal including the time offset value.

3. The power control method of claim 1, further comprising:
   receiving, from the BS, information related to the time offset value; and
   wherein the time offset value is identified based on the information related to the time offset value and timing relationship set information.

4. The power control method of claim 1, further comprising:
   receiving, from the BS, a first message including timing relationship set information; and
   receiving, from the BS, a second message including timing relationship indication value, wherein the time offset value is identified based on the timing relationship set information and timing relationship indication value.

5. The power control method of claim 1, wherein in case that the at least one first resource is idle, the power for transmitting the first priority data is determined as a first power,
wherein in case that the at least one first resource is occupied the at least one second resource for transmitting the second priority data, the power for transmitting the first priority data is determined as a second power, and
wherein the first power is smaller than the second power.

6. The power control method of claim 1,
wherein the power for transmitting the first priority data is determined as a second power,
a third power or a fourth power, in case that one part of the at least one first resource is occupied the at least one second resource and another part of the at least one first resource is idle,
wherein the third power is identified, based on at least one of a first power, the second power, a number of resources corresponding to the first power, or a number of resources corresponding to the second power; and
wherein the fourth power is identified based on, a ratio of the at least one second resource and idle resources among the at least one first resource.

7. The power control method of claim 1, further comprising:
determining a power headroom report (PHR), based on a timing requirement for required time for determining the PHR, according to one of a first power control parameter for transmitting the first priority data, a second power control parameter for transmitting the second priority data, or a default power control parameter, and
transmitting the determined PHR.

8. The power control method of claim 7,
wherein, in case that the timing requirement is satisfied with respect to transmitting the first priority data, the PHR is determined according to the first power control parameter,
wherein, in case that the timing requirement is unsatisfied with respect to transmitting the first priority data and the timing requirement is satisfied with respect to transmitting the second priority data, the PHR is determined according to the second power control parameter; and
wherein, in case that the timing requirement is unsatisfied with respect to transmitting the first priority data and transmitting the second priority data, the PHR is determined according to the default power control parameter.

9. The power control method of claim 7, wherein the timing requirement is satisfied in case that:
a number of orthogonal symbols spaced between a last symbol for downlink control information (DCI) and a start symbol for transmitting the PHR is not less than a predetermined value, or
end position of a last symbol of a DCI scheduling the second priority data or the first priority data is prior to of end position of a last symbol of a DCI scheduling for transmitting PHR via the PUSCH.

10. A user equipment (UE), comprising:
a transceiver; and
at least one processor operably connected to the transceiver, the at least one processor configured to:
control the transceiver to receive, from a base station (BS), resource occupation indication information, wherein the resource occupation indication information includes information about at least one second resource allocated for second priority data,
determine at least one first resource for transmitting first priority data, based on the resource occupation indication information and a time offset value, and
determine a power for transmitting the first priority data on the at least one first resource via a physical uplink shared channel (PUSCH),
wherein a priority of the first priority data is higher than that of the second priority data, and
wherein the time offset value is a difference time value between a time unit for transmitting the resource occupation indication information and a time unit for a resource scheduled by the resource occupation indication information.

11. The UE of claim 10, wherein the at least one processor is further configured to:
control the transceiver to receive, from the BS, a signal including the time offset value.

12. The UE of claim 10, wherein the at least one processor is further configured to:
control the transceiver to receive, from the BS, information related to the time offset value, and
wherein the time offset value is identified based on the information related to the time offset value and timing relationship set information.

13. The UE of claim 10, wherein the at least one processor is further configured to:
control the transceiver to receive, from the B S, a first message including timing relationship set information; and
control the transceiver to receive, from the BS, a second message including timing relationship indication value,
wherein the time offset value is identified based on the timing relationship set information and timing relationship indication value.

14. The UE of claim 10, wherein,
in case that the at least one first resource is idle, the power for transmitting the first priority data is determined as a first power,
wherein, in case that the at least one first resource is occupied the at least one second resource for transmitting the second priority data, the power for transmitting the first priority data is determined as a second power, and
wherein the first power is smaller than the second power.

15. The UE of claim 10,
wherein the power for transmitting the first priority data is determined as a second power, a third power, or a fourth power, in case that one part of the at least one first resource is occupied the at least one second resource and another part of the at least one first resource is idle,
wherein the third power is identified, based on at least one of a first power, the second power, a number of resources corresponding to the first power, or a number of resources corresponding to the second power; and
wherein the fourth power is identified based on, a ratio of the at least one second resource and idle resources among the at least one first resource.

16. The UE of claim 10, wherein the at least one processor is further configured to:
determine a power headroom report (PHR), based on a timing requirement for required time for determining the PHR, according to one of a first power control parameter for transmitting the first priority data, a second power control parameter for transmitting the second priority data, or a default power control parameter, and control the transceiver to transmit the determined PHR.

17. The UE of claim 16,
wherein, in case that the timing requirement is satisfied with respect to transmitting the first priority data, the PHR is determined according to the first power control parameter,
wherein, in case that the timing requirement is unsatisfied with respect to transmitting the first priority data and the timing requirement is satisfied with respect to transmitting the second priority data, the PHR is determined according to the second power control parameter; and
wherein, in case that the timing requirement is unsatisfied with respect to transmitting the first priority data and transmitting the second priority data, the PHR is determined according to the default power control parameter.

18. The UE of claim 16, wherein the timing requirement is satisfied in case that:
a number of symbols spaced between a last symbol for downlink control information (DCI) and a start symbol for transmitting the PHR is not less than a predetermined value, or
end position of a last symbol of a DCI scheduling the second priority data or the first priority data is prior to of end position of a last symbol of a DCI scheduling for transmitting PHR via the PUSCH.

* * * * *